(12) United States Patent
Sekime et al.

(10) Patent No.: US 6,392,722 B1
(45) Date of Patent: May 21, 2002

(54) LIQUID CRYSTAL DISPLAY DEVICE, AND VIDEO DISPLAY APPARATUS, INFORMATION PROCESSING APPARATUS USING IT AND METHOD THEREOF

(75) Inventors: Tomoaki Sekime; Yoshio Iwai; Hisanori Yamaguchi, all of Ishikawa; Naoki Kato, deceased, late of Ishikawa; by Mieko Kato, legal representative, Aichi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/364,234

(22) Filed: Jul. 29, 1999

(30) Foreign Application Priority Data

Jul. 30, 1998 (JP) .......................................... 10-215949

(51) Int. Cl.[7] ......................... G02F 1/136; G02F 1/1333
(52) U.S. Cl. ......................................... 349/47; 349/138
(58) Field of Search ........................... 349/43, 138, 42, 349/139; 257/59

(56) References Cited

U.S. PATENT DOCUMENTS

| | | | |
|---|---|---|---|
| 5,943,105 A | * 8/1999 | Fujikawa et al. | 349/38 |
| 6,081,310 A | * 6/2000 | Katsuya et al. | 349/113 |
| 6,128,060 A | * 10/2000 | Shimada et al. | 349/138 |
| 6,191,832 B1 | * 2/2001 | Nakakura | 349/54 |
| 6,208,400 B1 | * 3/2001 | Kameyama et al. | 349/147 |

FOREIGN PATENT DOCUMENTS

| | | |
|---|---|---|
| JP | 08160463 A | 6/1996 |
| JP | 10148845 A | 6/1998 |

* cited by examiner

Primary Examiner—Toan Ton
(74) Attorney, Agent, or Firm—Ratner & Prestia

(57) ABSTRACT

A liquid crystal display device with excellent display characteristics such as dot defects and missing of pixels prevented from occurring, a bright display screen and the like can be realized. In addition, a yield rate is enhanced remarkably. The display device has a transparent substrate, nonlinear elements, each having a plurality of electrodes, disposed on the transparent substrate, a protective film disposed on each respective nonlinear element of above, an interlayer insulating film disposed on the protective film and a pixel electrode disposed on the interlayer insulating film. An opening, the cross-section of which is configured in a V-letter like slanting shape, is formed in the protective film and interlayer insulating film, respectively. The opening is exposed to the surface of the nonlinear element. Each respective opening of above forms a first end part on the protective film and a second end part on the interlayer insulating film and the first end part is located outside of the second end part. One of the plurality of electrodes disposed on the nonlinear element is in contact with the pixel electrode in the opening.

21 Claims, 6 Drawing Sheets

(a)

(b)

LIQUID CRYSTAL DISPLAY DEVICE, AND VIDEO DISPLAY APPARATUS, INFORMATION PROCESSING APPARATUS USING IT AND METHOD THEREOF

FIELD OF THE INVENTION

The present invention relates to an active matrix liquid crystal display device and particularly relates to a reflective type liquid crystal display device.

BACKGROUND OF THE INVENTION

In recent years, as such information and communication equipment as portable telephone, PHS (Personal Handy Phone System), PDA (Personal Digital Assistant) and the like springs into wide use, a required infrastructure has been in completion, thereby allowing anyone to access and send out information easily regardless of time and place.

Since such information and communication equipment is used in mobile applications, features such as being thin in size, light in weight and low in power consumption are required of a display system. Nowadays, the liquid crystal display device occupies a central position among such display systems. Among the variety of liquid crystal display devices, a reflective type liquid crystal display device requiring no back light is becoming a main-stream. A typical prior art active matrix reflective type liquid crystal display device is disclosed in Japanese Patent Application Unexamined Publication No. H08-160463.

A description is made on a typical prior art active matrix reflective type liquid crystal display device as follows:

An active matrix reflective type liquid crystal display device has a transparent substrate, many pixel electrodes disposed on the foregoing transparent substrate and non-linear elements to drive respective pixel electrodes.

As the non-linear element is used a thin film diode, a thin film transistor (referred to as TFT hereafter) or the like. These pixel electrodes and non-linear elements are arranged in a two-dimensional matrix pattern.

In the following description, a typical prior art active matrix reflective type liquid crystal display device uses a TFT as the non-linear element.

FIG. 6 shows an opening and a TFT element of a prior art active matrix reflective type liquid crystal display device, and FIG. 6(b) shows a cross-sectional view of the above opening and TFT element and FIG. 6(a) shows a plan view of the opening of FIG. 6(b). In FIG. 6(a), a depiction of a reflective pixel electrode 401 is omitted for easy recognition of the size of the opening.

A gate insulating film 408 is disposed on a glass substrate 410.

A protective film 403 is disposed on the gate insulating film 408. An interlayer insulating film 402 is disposed on the protective film 403. The reflective pixel electrode 401 is disposed on the interlayer insulating film 402. A TFT element 411 has a drain electrode 405, a source electrode 406, a semiconductor layer 407 and a gate electrode 409.

By way of an opening 404 acting as a contact hole, the reflective pixel electrode 401 and the drain electrode 405 become conductive with each other.

In the structure as described above, the distance between the gate electrode 409 acting as a scanning line electrode and the reflective pixel electrode 401 can be shortened and further the distance between the source electrode 406 acting as a signal line electrode and the reflective pixel electrode 401 can be shortened. At the same time, a short circuit between the reflective pixel electrode 401 and the gate electrode 409 and between the reflective pixel electrode 401 and the source electrode 406 can be prevented from occurring by the interlayer insulating film 402, thereby allowing the opening ratio to be increased by a large amount when compared with the case where no interlayer insulating film is used.

However, the prior art active matrix reflective type liquid crystal display device as described above has some problems as in the following:

For instance, with the prior art liquid crystal display device, the size of the opening 404 at the protective film 403 measures 6 μm in the longitudinal length "Xa" and 6 μm in the lateral length "Ya". The size of the opening 404 at the interlayer insulating film 402 measures 15 μm in the longitudinal length "Xb" and 15 μm in the lateral length "Yb". In this case, the dimension of the opening 404 at the protective film 403 and the dimension of the opening 404 at the interlayer insulating film 402 are different from each other.

As a result, a step-wise difference in level ["A" in FIG. 6(b)] is formed on the reflective pixel electrode 401 at the boundary of the protective film 403 and the interlayer insulating film 402. Because of this step-wise difference in level, a break in the reflective pixel electrode 401 is likely to occur. When the break occurs in the reflective pixel electrode 401, the electrical continuity between the reflective pixel electrode 401 and the TFT element 411 can not be secured, thereby causing the problem of dot defects to the liquid crystal display device.

In addition, with a liquid crystal display device using pixel electrodes that are formed mainly of aluminum, such defects as poor contact, disconnection and the like are caused by the differences in film thickness of the reflective pixel electrodes, having resulted in such problems as a display failure, a reduction in reflectivity and the like The present invention provides a liquid crystal display device, which enables the prevention of a break in pixel electrodes from occurring and the realization of excellent display characteristics, and provides a video display apparatus and an information processing apparatus using the foregoing liquid crystal display device.

SUMMARY OF THE INVENTION

A display device which employs a liquid crystal material of the present invention comprises:

a transparent substrate;

nonlinear elements, each of which has a plurality of electrodes, disposed on the transparent substrate;

a protective film disposed on each respective nonlinear element of above;

an interlayer insulating film disposed on the protective film; and a pixel electrode disposed on the interlayer insulating film, in which an opening with the cross-section thereof configured in a V-letter like slanting shape is formed in the protective film and interlayer insulating film, respectively, the openings are exposed to the surface of the nonlinear element, one of the openings is provided with a first end part formed on the protective film and the other is provided with a second end part formed on the interlayer insulating film, the first end part is located outside of the second end part, the pixel electrode is also disposed on the interlayer insulating film of the opening and an electrode out of the plurality of electrodes of the nonlinear element is in contact with the pixel electrode in the opening.

A manufacturing method of display device employed liquid crystal material of the present invention comprising the steps of:

(a) disposing a nonlinear element having a plurality of electrodes an a substrate (b) disposing a protective film with covering said nonlinear element, in which said protective film has a lower opening, and a first electrode of said plurality of electrodes exposes at said lower opening, (c) disposing a interlayer insulating film with covering said protective film, in which said interlayer insulating film has an upper opening formed at a place according to said lower opening, and said first electrode exposes at said upper opening, and (d) disposing a pixel electrode with covering said interlayer insulating film and said first electrode,
wherein said lower opening and said upper opening formed a opening,
said opening has a V-letter like slanting shape,
said opening has a first end part formed on said protective film and a second end part formed on said interlayer insulating film, and
said opening is formed so that said first end part is located outside of said second end part.

According to the above structure, dot defects are prevented from occurring and missing of pixels is prevented, thereby realizing a display device with excellent display characteristics such as a bright display screen and the like. Furthermore, the yield rate of conforming display devices is remarkably improved.

A video display apparatus of the present invention employs the display device as described above. The video display apparatus thus configured shows excellent display characteristics in the same way as described above.

An information processing apparatus of the present invention employs the display device as described above. The information processing apparatus thus configured shows excellent display characteristics in the same way as described above.

BRIEF DESCRIPTION OF THE DRAWINGS

FIG. 1(a) is a plan view of an opening of the liquid crystal display, device and FIG. 1(b) is a cross-sectional view of FIG. 1(a).

FIG. 6 shows a typical prior art active matrix reflective type liquid crystal display device and FIG. 6(a) is a plan view of an opening of the prior art liquid crystal display device and FIG. 6(b) is a cross-sectional view of FIG. 6(a).

Key to Reference Numerals

Figure 1:
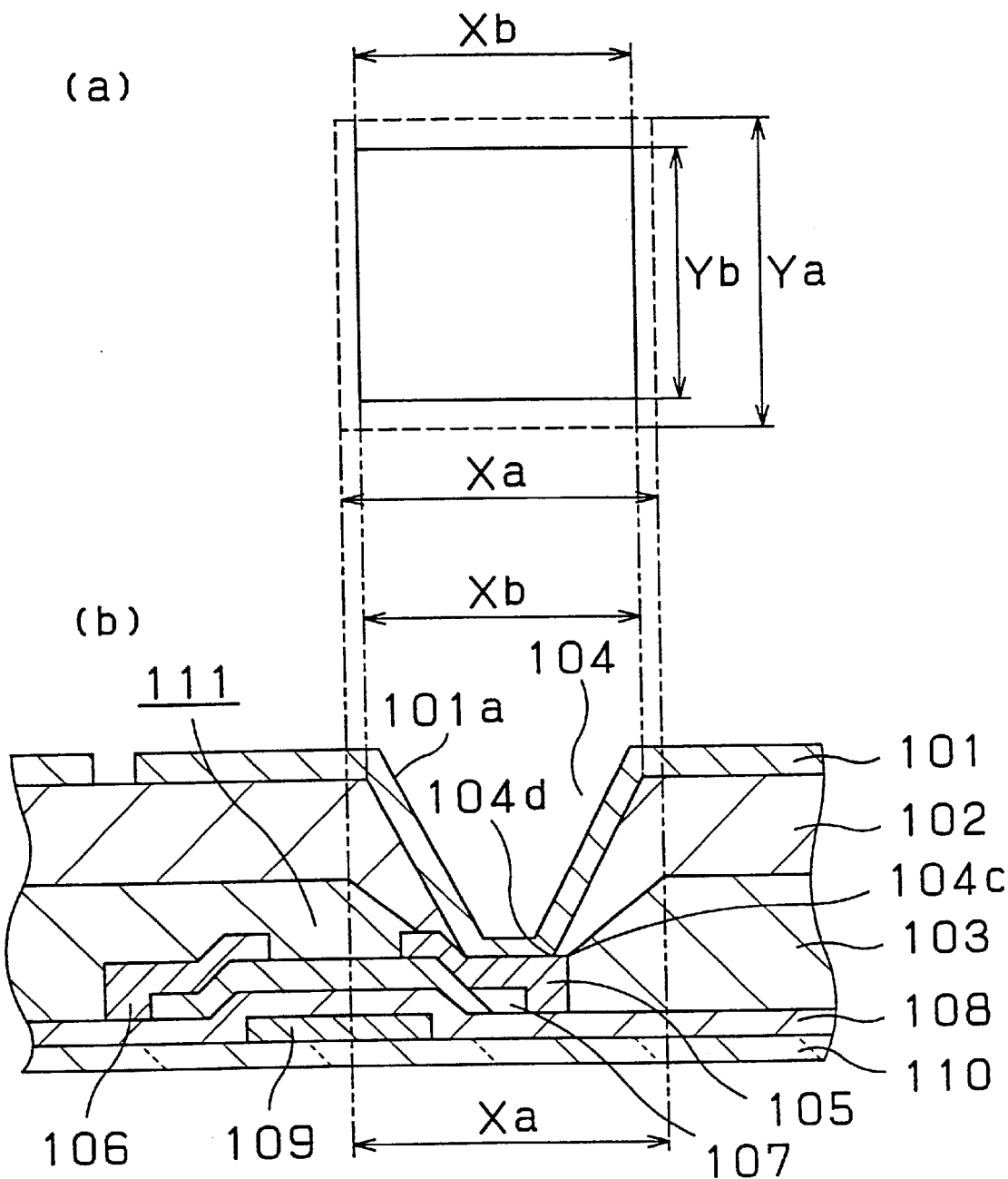
FIG. 1 shows an essential part of a liquid crystal display device in a first exemplary embodiment of the present invention.

| 101, 401 | Reflective Pixel Electrode |
| 102, 402 | Interlayer Insulating Film |
| 103, 403 | Protective Film |
| 104, 404 | Opening |
| 104a | Opening Leading to Storage Capacitor |
| 104b | Opening Leading to TFT Drive Element |
| 105, 405 | Drain Electrode |
| 106, 406 | Source Electrode |
| 107, 407 | Semiconductor Layer |
| 108, 408 | Gate Insulating Film |
| 109, 409 | Gate Electrode |
| 110, 410 | Transparent Substrate (Glass Substrate) |
| 111 | Nonlinear Element (TFT, Thin Film Diode, MIM) |
| 200 | Transparent Electrode Substrate |
| 206 | Signal Line Electrode |
| 209 | Scanning Line Electrode |
| 210 | Liquid Crystal |

DETAILED DESCRIPTION OF THE INVENTION

The present invention's display device employing a liquid crystal material comprises a transparent substrate, scanning line electrodes (or referring to as gate line electrodes) and signal line electrodes (referring to as source line electrodes, data line electrodes or display line electrodes) both formed on the transparent substrate in a matrix pattern, nonlinear elements formed on the points of intersection of the above two kinds of line electrode, a protective film formed on each respective nonlinear element of above, an interlayer insulating film formed on the protective film and a pixel electrode formed on the interlayer insulating film. An opening with the cross-section thereof configured in a V-letter like slanting shape is formed in both the protective film and the interlayer insulating film situated atop the nonlinear element, and the pixel electrode and an electrode of the nonlinear element are brought into contact with each other by the opening and an end part of the opening in the protective film is located outside of an end part of the opening in the interlayer insulating film.

Accordingly, the interlayer insulating film can be formed so as to cover the protective film in the opening, thereby allowing the boundary of the protective film and the interlayer insulating film to disappear. Furthermore, the configuration of the pixel electrode formed on the interlayer insulating film can reflect the configuration of the interlayer insulating film as is. Therefore, the interlayer insulating film in the opening can be formed without any step-wise difference in level. As a result, a break in the interlayer insulating film located in the opening can be prevented and further a display device with excellent display characteristics can be realized.

It is particularly preferred that one of the electrodes of the nonlinear element of above, which is in contact with the pixel electrode, is brought into contact with the interlayer insulating film. In this configuration, the interlayer insulating film covers the entire area of the protective film situated in the opening. Therefore, a step-wise difference in level of the interlayer insulating film is prevented from being formed in the opening without fail.

It is particularly preferred that the protective film situated in the opening is covered with the interlayer insulating film. According to this configuration, no step-wise difference in level is formed on the interlayer insulating film in the opening and a break in the interlayer insulating film situated in the opening can be prevented, thereby realizing a display device with excellent display characteristics.

It is particularly preferred that the shape of each respective opening in the protective film and the interlayer insulating film is close to a square and, when the length of the protective film in the opening along the direction in parallel with the scanning line electrode is "Xa" and the length of the interlayer insulating film in the opening along the direction in parallel with the scanning line electrode is "Xb", an inequality of "Xa">"Xb" is established. According to this configuration, the interlayer insulating film in the opening can be made free of a step-wise difference in level. Therefore, a break in the interlayer insulating film situated in the opening is prevented with a resulting realization of a display device having excellent display characteristics.

It is particularly preferred that the above length "Xa" falls in the range defined by an inequality of "5 $\mu$m$\leq$Xa$\leq$30 $\mu$m" and also the length "Xb" falls in the range defined by an inequality of "5 $\mu$m$\leq$Xb$\leq$30 $\mu$m".

According to this configuration, such a phenomenon as a break in the electrical continuity between the pixel electrode and the nonlinear element or an excessive increase in scattering component can be prevented from occurring.

It is particularly preferred that the shape of each respective opening in the protective film and the interlayer insulating film is close to a square and, when the length of the protective film in the opening along the direction in parallel with the signal line electrode is "Ya" and the length of the interlayer insulating film in the opening along the direction in parallel with the signal line electrode is "Yb", an inequality of "Ya>Yb" is established. According to this configuration, the interlayer insulating film in the opening can be made free of a step-wise difference in level. Therefore, a break in the interlayer insulating film situated in the opening is prevented from occurring with a resulting realization of a display device having excellent display characteristics.

It is particularly preferred that the above length "Ya" falls in the range defined by an inequality of "5 $\mu$m$\leq$Ya$\leq$30 $\mu$m" and also the length "Yb" falls in the range defined by an inequality of "5 $\mu$m$\leq$Yb$\leq$30 $\mu$m".

According to this configuration, such a phenomenon as a break in the electrical continuity between the pixel electrode and the nonlinear element or an excessive increase in scattering component can be prevented from occurring.

It is particularly preferred that the above pixel electrode is formed of at least a metallic material selected from the group of aluminum, aluminum alloys and silver.

It is particularly preferred that the pixel electrode has two layers of pixel electrode and out of the two pixel electrode layers one layer is formed of titanium and the other layer is formed of at least a metallic material selected from the group of aluminum and aluminum alloys.

It is particularly preferred that out of the layers forming the above pixel electrode the film thickness of the layer formed of aluminum or an aluminum alloy ranges from 50 nm to 300 nm. According to this configuration, disconnection is prevented and dot defects of the display device due to poor contact between the pixel electrode and the nonlinear element are prevented from occurring, and further a reduction in reflectivity is prevented.

A video display apparatus of the present invention employs the liquid crystal display device as described above, thereby exhibiting the same excellent display characteristics as described in the above.

An information processing apparatus of the present invention employs the liquid crystal display device as described above, thereby exhibiting the same excellent display characteristics as described in the above.

Next, some of the typical exemplary embodiments of the present invention are described with reference to drawings.

First Exemplary Embodiment

Figure 5A:
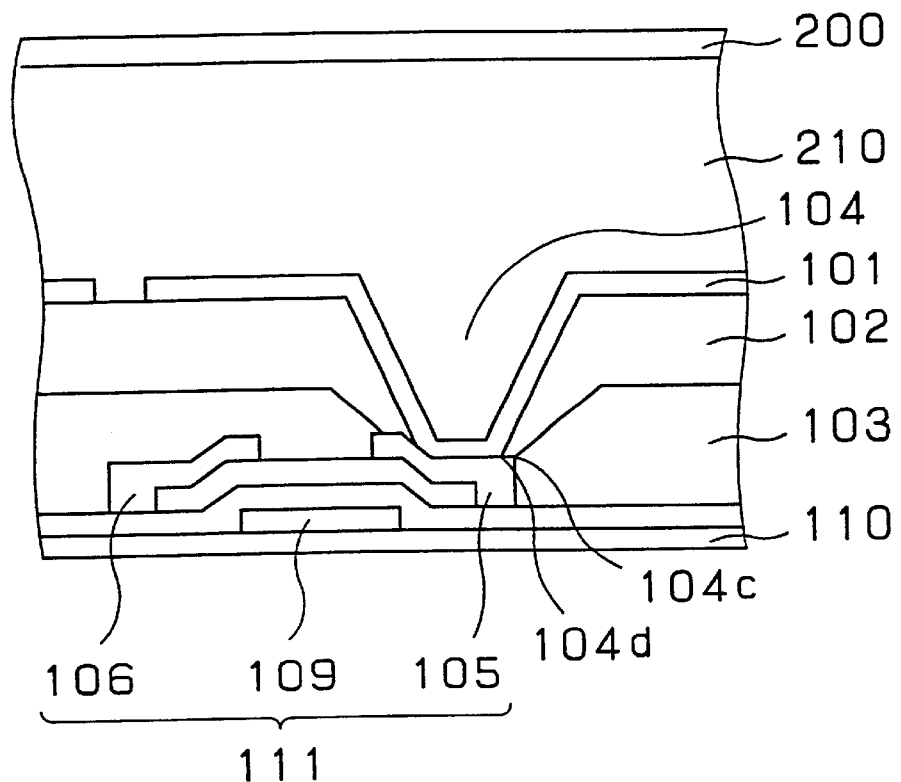
FIG. 5(a) is a schematic diagram of the structure of a liquid crystal display device in an exemplary embodiment of the present invention
Figure 5B:
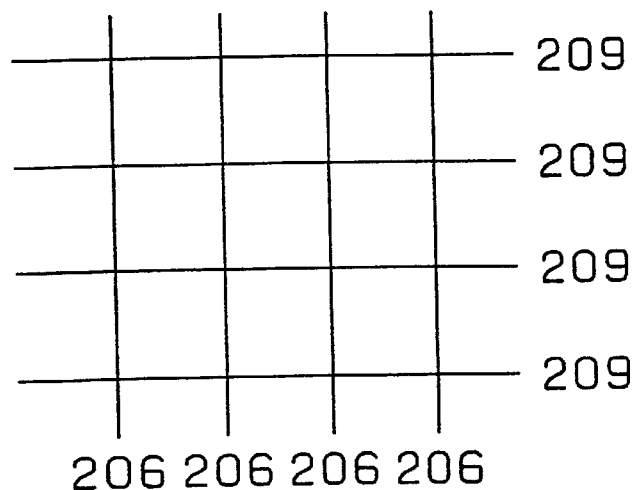
FIG. 5(b) is a diagram describing the positional arrangement of scanning line electrodes and signal line electrodes of a liquid crystal display device in an exemplary embodiment of the present invention.
Figure 6:
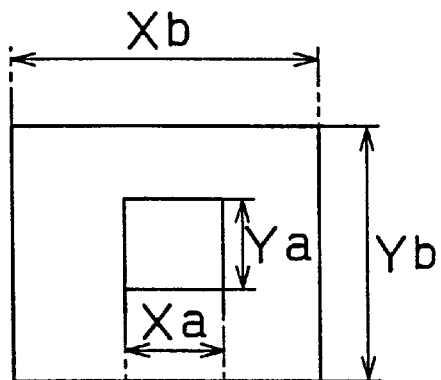
Figure 6:
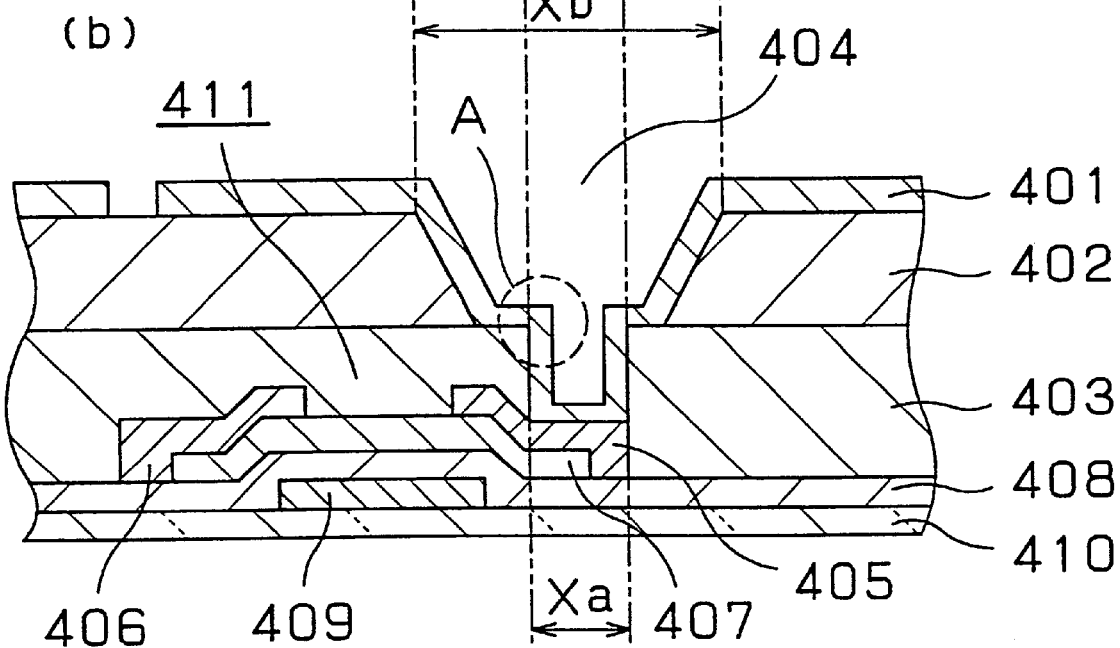

FIG. 5(a) and FIG. 5(b) show a diagrammatic sketch of the construction of an active matrix reflective type liquid crystal display device in a first exemplary embodiment of the present invention. In FIG. 5(b), a plurality of scanning line electrodes 209 and a plurality of signal line electrodes 206 are disposed on a transparent substrate 110 in a matrix pattern. The plurality of scanning line electrodes 209 and the plurality of signal line electrodes 206 are electrically insulated from one another.

In FIG. 5(a), a plurality of nonlinear elements 111 are respectively disposed on the transparent substrate 110 at positions corresponding to intersections of the matrix pattern in an orderly aligned manner. A thin film transistor constitutes each of the nonlinear elements 111. Each respective thin film transistor 111 has a plurality of electrodes comprising a gate electrode 109, drain electrode 105 and source electrode 106. A protective film 103 and interlayer insulating film 102 are disposed on each of the plurality of nonlinear elements 111. On the interlayer insulating film 102 is disposed a pixel electrode 101. Between the pixel electrode 101 and a transparent electrode substrate 200 is placed a liquid crystal cell 210 encapsulating a liquid crystal material 220. The gate electrode 109 is connected to the scanning line electrode 209, an end of which is connected to a scanning line electrode drive circuit. The source electrode 106 is connected to the signal line electrode 206, an end of which is connected to a signal line electrode drive circuit. By controlling an electrical input to the scanning line electrode drive circuit, signal line electrode drive circuit and transparent electrode substrate 210, the liquid crystal material 220 on the pixel electrode 101 located at each respective nonlinear element 111 undergoes an optical change, thereby switching the passage of light on or off.

FIG. 1(b) is a cross-sectional view of the active matrix reflective type liquid crystal display device in the first exemplified embodiment, showing the vicinity of the TFT element 111 and an opening 104. FIG. 1(a) is a plan view of the opening 104. In FIG. 1(a), a scanning line electrode and a signal line electrode are not depicted for discerning the dimensions of the opening 104 readily.

The TFT element 111 acting as a nonlinear element is disposed on the glass substrate 110 serving as a transparent substrate. The protective film 103 is disposed on the TFT element 111. The interlayer insulating film 102 is disposed on the protective film 103. The pixel electrode 101 is disposed on the interlayer insulating film 102. The opening 104 with the cross-section thereof configured in a V-letter like slanting shape is formed in the protective film 103 and interlayer insulating film 102, respectively, and the opening 104 is exposed to the surface of the TFT element 111. The opening 104 is provided with a first end part 104c formed on the protective film 103 and a second end part 104d formed on the interlayer insulating film 102 with the first end part 104c located outside of the second end part 104d. The pixel electrode 101 is also disposed on the interlayer insulating film 102 in the opening 104 and the drain electrode 105 out of the plurality of electrodes of the TFT element 111 is in contact with the pixel electrode 101 in the opening 104. The opening 104 is provided with a lower opening formed in the protective film 103 and an upper opening formed in the interlayer insulating film 102 with the upper most edges of the lower opening shaped almost like a square and the upper most edges of the upper opening also shaped almost like a square. The longitudinal length of the square edges of the lower opening is larger than that of the upper opening and the lateral length of the square edges of the lower opening is larger than that of the upper opening.

Next, a more detailed description is given to the above structure. A gate insulating film 108 is formed on the glass substrate 110. In the domain of the TFT element 111, the gate electrode 109 is formed between the glass substrate 110 and the gate insulating film 108. On the gate insulating film 108 are formed a semiconductor layer 107, the drain electrode 105 and the source electrode 106. The TFT element 111 is protected with the protective film 103.

By forming the opening 104 acting as a contact hole, electrical continuity is established between the reflective pixel electrode 101 and the drain electrode 105 of the TFT element 111.

Figure 2:
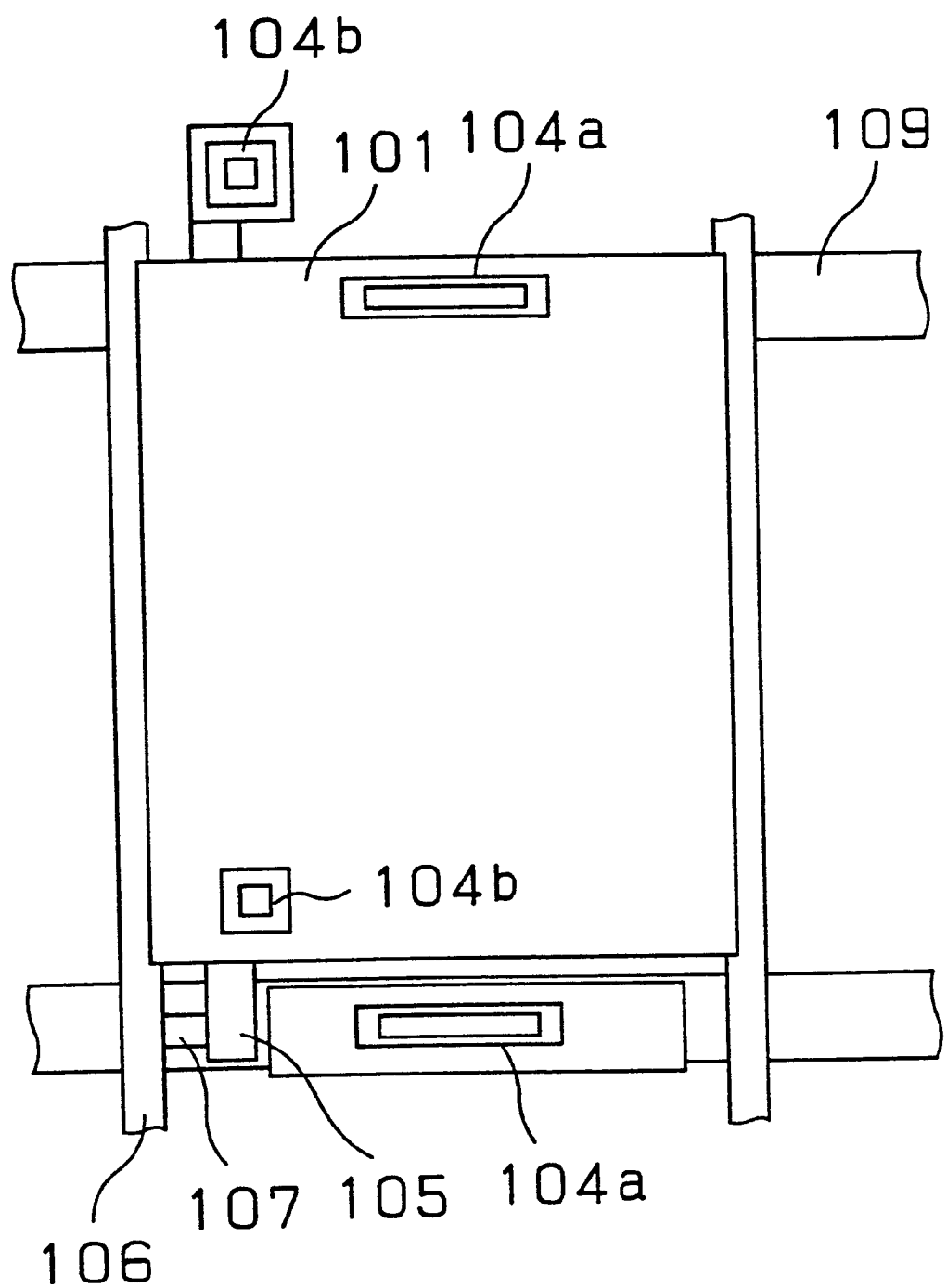
FIG. 2 is a plan view of one pixel of the liquid crystal display device in the first exemplary embodiment of the present invention

FIG. 2 is a plan view of an area corresponding to one pixel of the liquid crystal display device. The liquid crystal display device is provided with a first opening 104a for conduction to a storage capacitor and a second opening 104b for conduction to the reflective pixel electrode 101 and the drain electrode 105 of the TFT element 111.

A method of manufacturing the liquid crystal display device is described with reference to FIG. 1. First, the gate electrode 109 is formed on the glass substrate 110. The glass substrate 110 is transparent and formed of glass, quartz and the like. The gate electrode 109 acts as a scanning line electrode. The gate electrode 109 is formed of aluminum, for example, according to such a method as sputtering, photolithography, etching and the like.

Next, a silicon nitride film (SiNx) acting as the gate insulating film 108 is formed according to a plasma CVD method, for example, and amorphous silicon (a-Si) acting as the semiconductor layer 107 is formed.

These film and layer are formed continuously by deposition.

Then, the drain electrode 105, source electrode 106 serving as a signal line electrode are formed by a deposition of titan, for example, according to such a method as sputtering, photolithography or etching. And, a nitride film acting as the protective film 103 is formed on the above according to such a method as plasma CVD, photolithography, etching and the like.

Then, a photosensitive acrylic transparent resin to serve as the interlayer insulating film 102 is formed on the above to about 3 $\mu$m in film thickness.

Furthermore, in the foregoing processing steps, the lower opening with the cross-section thereof shaped like a V-letter is formed in the protective film 103 and the upper opening with the cross-section thereof shaped like a V-letter is formed in the interlayer insulating film 102. As shown in FIG. 1, after the lower opening has been formed, the interlayer insulating film 102 is disposed thereon, and then the upper opening is formed. In other words, the opening 104 comprising openings formed in the protective film 103 and interlayer insulating film 102 with each respective cross-section shaped like a V-letter is ultimately formed as shown in FIG. 1(b).

Then, the reflective pixel electrode 101 is formed by depositing aluminum according to at least one method selected from the methods of sputtering, photo-lithography and etching. As a result, electrical continuity is established between the reflective pixel electrode 101 and the drain electrode 105 in the opening 104.

A description is made more specifically on the opening 104 as follows:

In FIG. 1, an opening with the cross-section thereof configured in a V-letter like slanting shape is formed in the protective film 103 and interlayer insulating film 102, respectively. The openings are exposed to the surface of the drain electrode 105, which is one of the electrodes of the nonlinear element 111. One of the openings is provided with the first end part 104c formed on the protective film 103 and the other opening is provided with the second end part 104d formed on the interlayer insulating film 102. In other words, the first end part 104c is located on the bottom edge of the lower opening and the second end part 104d is located on the bottom edge of the upper opening. Therefore, the first end part 104c is situated outside of the second end part 104d. That is to say, the interlayer insulating film 102 is formed so as to cover the first end part 104c, which is situated outside of the second end part 104d in the ultimately formed opening 104. A pixel electrode 101a is disposed on the interlayer insulating film 102 in the opening 104. The drain electrode 105 is in contact with the pixel electrode 101a in the opening 104.

The surface configurations of the opening 104 do not show any step-wise difference in level. In other words, the surface configurations of the opening 104 are smooth or slanting in continuation. Therefore, the pixel electrode 101a disposed on the opening 104 has a surface conforming to the smooth surface of the opening 104 without showing any step-wise difference in level. The lower opening has a first gradient and the upper opening has a second gradient, and the second gradient is larger than the first gradient. When the lower opening is significantly larger in dimension than the upper opening, it is not necessary for the second gradient to have a larger gradient than the first gradient.

A length of one of the sides formed by the upper most edges of the opening formed in the protective film 103 is "Xa" and another length of one of the sides formed by the upper most edges of the opening formed in the interlayer insulating film 102 is "Xb", and these lengths "Xa" and "Xb" are both measured in a direction parallel to the scanning line electrode 209.

In the same way, a length of the opening formed in the protective film 103 is "Ya" and another length of the opening formed in the interlayer insulating film 102 is "Yb", and these lengths "Ya" and "Yb" are both measured in a direction parallel to the signal line electrode 206.

These lengths "Xa", "Xb", "Y" and "Yb" satisfy at least an inequality selected from the inequalities "Xa>Xb" and "Ya>Yb". FIG. 1(b) shows the case where both inequalities of above are satisfied. When the inequality of Xa>Xb is satisfied, it is preferred that both inequalities of "5 $\mu$m≦Xa≦30 $\mu$m" and "5 $\mu$m≦Xb≦30 $\mu$m" are satisfied. For example, when "Xa" is 15 $\mu$m and "Xb" is 10 $\mu$m, the above condition is satisfied.

When the foregoing lengths of the sides of the openings fall short of 4 $\mu$m inclusive, no electrical continuity can be maintained between the pixel electrode 101 and the TFT element 111, and when the lengths of the sides of the openings exceed 30 $\mu$m inclusive, the magnitude of scattering components becomes excessive due to microscopic asperities existing in the openings. When the lengths of the sides of the openings measure more than 5 $\mu$m inclusive, a yield rate exceeding a given limit can be secured.

Figure 3:
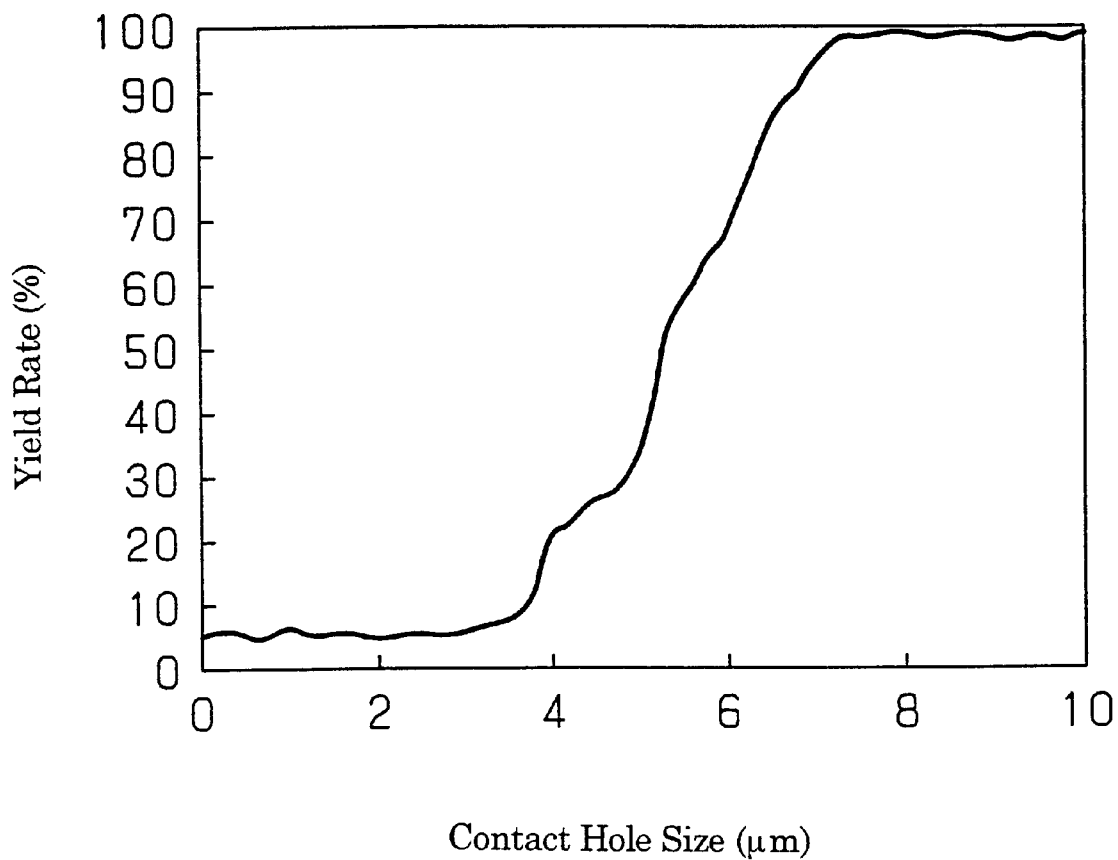
FIG. 3 is a graph showing the relationship between the size of the opening,and the yield rate.

FIG. 3 shows the relationship between the contact hole size and the yield rate. The contact hole size as shown in FIG. 3 is the size of the contact hole formed in the interlayer insulating film 102 when "Xb" equals "Yb".

As seen in FIG. 3, when the contact hole size exceeds 5 μm, a substantially good yield rate can be achieved.

It is particularly preferred that, when an inequality of "Ya>Yb" is satisfied, both inequalities of "5 μm≦Ya≦30 μm" and "5 μm≦Yb≦30 μm" are satisfied for the same reason as applied to the case involving "Xa" and "Xb".

For example, it is preferable that "Ya" is 15 μ and "Yb" is 10 μm.

It is particularly preferred that the lengths "Xa", "Xb", "Ya" and "Yb" satisfy inequalities of "Xa≧Xb+3 μm" and "Ya≧Yb+3 μm" when the alignment errors between the protective film 103 and the interlayer insulating film 102 that are likely to incur at the time of photolithography are taken into consideration.

When the opening 104 is ultimately formed as described above, no boundaries are formed between the. protective film 103 and the interlayer insulating film 102 as shown in FIG. 1(b) since the interlayer insulating film 102 is formed so as to cover the protective film 103. Further, the configuration of the reflective pixel electrode 101 ends up reflecting the configuration of the interlayer insulating film 102 as is. Therefore, no step-wise difference in level appears on the reflective pixel electrode 101 in the opening 104 due to no existence of the boundaries between the protective film 103 and the interlayer insulating film 102, thereby preventing a break in the reflective pixel electrode 101 and missing of pixels. As a result, pixel defects are prevented from occurring and a display device with excellent display characteristics can be realized.

Display devices with a variety of structures have been actually built. As a result, it is found out that the yield rate of the display device having boundaries between the protective film 103 and the interlayer insulating film 102 in the opening 104 in the same way as a prior art display device is about 10%. In contrast, a display device structured according to the present exemplified embodiment can prevent dot defects due to a break in the reflective pixel electrode 101 from occurring with a resulting yield rate of about 95%. Thus, it has been confirmed that an excellent yield rate can be achieved with the display device of the present exemplary embodiment when compared with the prior art display device.

With the present exemplary embodiment, two layers of the protective film 103 and interlayer insulating film 102 are formed between the drain electrode 105 and the reflective pixel electrode 101, an opening is formed in each of the two layers and electrical continuity is established therebetween in each respective opening. Alternatively, it is also possible to adopt a structure, in which the protective film 103 and two layers of the interlayer insulating film 102 are formed between the drain electrode 105 and the reflective pixel electrode 101. A display device with the above structure performs with the same effects as the one in the present exemplary embodiment.

It is also possible for the display device of the present exemplary embodiment to have the upper most edges of the opening 104 shaped like close to a polygon, close to a quadrangle or a circle. With the display device having the opening 104 shaped like close to a polygon, the relationship that exists among the lengths of respective sides of the polygon is preferably the same as exists among the lengths "Xa", "Ya", "Xb" and "Yb" of respective sides of the foregoing opening shaped like close to a square. A display device with the above structure can perform with the foregoing effects that are more excellent than a prior art display device but with reduced effects when compared with the foregoing display device with the opening shaped like close to a square.

Second Exemplary Embodiment

A description is made on a typical second exemplary embodiment with reference to FIG. 1.

In the second exemplary embodiment, the reflective pixel electrode 101 has two layers of titanium layer and aluminum layer. An aluminum alloy layer is formed on the titanium layer. The thickness of the titanium layer is 80 nm and a variety of sample reflective pixel electrodes 101 have been prepared, each having a layer thickness of aluminum alloy that is different from one another. Using these various sample reflective pixel electrodes 101, measurement data have been collected on the conditions, under which dot defects are caused due to a break in the reflective pixel electrode 101 and a poor contact with the TFT element 111.

It is found out that, in case where the thickness of the aluminum alloy layer does not exceed 50 nm, dot defects occur frequently due to a break in the reflective pixel electrode 101 and a poor contact with the TFT element 111 caused by the excessively thin layer of the aluminum alloy, resulting in a yield of less than 5%.

Figure 4:
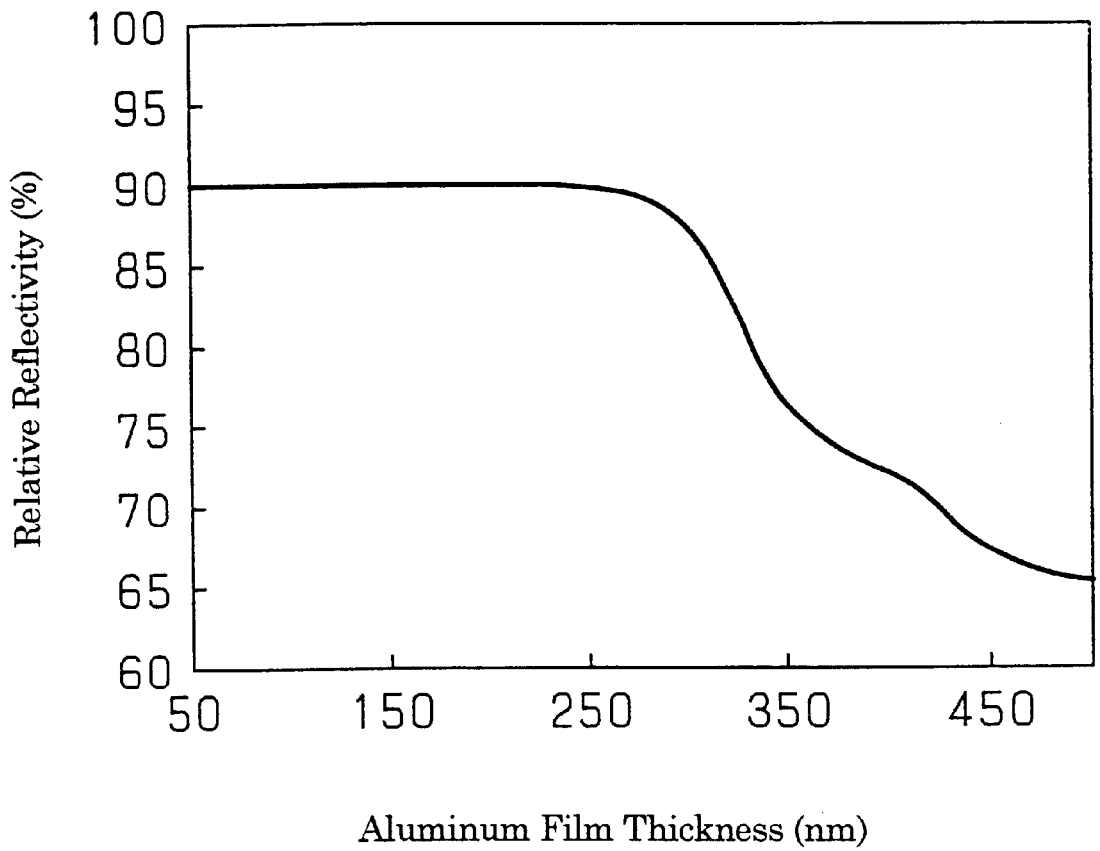
FIG. 4 graph showing the correlation between the thickness of an aluminum film of a reflective pixel electrode and the relative reflectivity in the exemplary embodiments of the present invention.

FIG. 4 shows the relationship between the thickness of the aluminum alloy and the relative reflectivity. The vertical axis indicates the relative reflectivity of the aluminum alloy layer with the reflectivity of a standard white plate of oxide magnesium taken as 100. In FIG. 4, when the thickness of the aluminum alloy layer exceeds about 350 nm, the reflectivity decreases rapidly. When the reflectivity is reduced to such low levels, the brightness of the display device becomes too low to be used practically.

Over the range of about 50 nm to about 300 nm in the thickness of the aluminum alloy layer, a poor contact, a break and a reduction in reflectivity of the reflective pixel electrode 101 can be prevented. As a result, it is made possible to realize an active matrix reflective type liquid crystal display device with excellent display characteristics such as no missing of pixels, enhanced brightness of display screen and the like.

Although a two layer structure formed of a titanium layer and an aluminum alloy layer is adopted in the present exemplary embodiment, other structures also can be used. For example, when the reflective pixel electrode 101 is formed of a layer of pure aluminum or formed of two layers of titanium and pure aluminum, the same effects as the present exemplary embodiment can be achieved.

Although, a TFT element is used as the nonlinear element in the foregoing first and second exemplary embodiments, other nonlinear elements can also be used. For example, when a thin film diode or an MIM □(Metal Insulator Metal) is used as the nonlinear element, the same effects can be achieved as described above.

The liquid crystal display device in the foregoing exemplary embodiments can be used in a video display apparatus and an information processing apparatus. Those video display apparatus and information processing apparatus show excellent display characteristics such as no flaws due to dot defects, bright display screens and the like.

As described above, a liquid crystal display device of the present invention has a feature of locating the end part of an opening in a protective film outside of the end part of an opening in an interlayer insulating film, thereby allowing the interlayer insulating film disposed in the opening of the liquid display device to cover the protective film and enabling the elimination of boundaries between the protective film and the interlayer insulating film.

In addition, a pixel electrode formed on the interlayer insulating film reflects the shape of the interlayer insulating film as is, thereby allowing the interlayer insulating film in the opening to have no step-wise difference in level with a resulting contribution to the prevention of a break caused in the interlayer insulating film in the opening.

Furthermore, when the thickness of an aluminum layer or an aluminum alloy layer used as a reflective pixel electrode ranges from about 50 nm to about 300 nm, dot defects due to a break in the reflective pixel electrode and a poor contact with a nonlinear element, and a reduction in reflectivity can be prevented.

Thus, a liquid crystal display device with excellent display characteristics such as having dot defects and missing of pixels prevented from occurring, a bright display screen and the like can be realized. In addition, a yield rate of the display device is remarkably enhanced.

What is claimed is:

1. A display device, which employs a liquid crystal material, comprising:
    a transparent substrate;
    a nonlinear element having a plurality of electrodes, said nonlinear element being disposed on said transparent substrate;
    a protective film disposed on said nonlinear element;
    an interlayer insulating film disposed on said protective film; and a pixel electrode disposed on said interlayer insulating film,
    said protective film has a first opening, said first opening having a first end part;
    said interlayer insulating film disposed on a surface of said protective film situated in said first opening,
    said interlayer insulating film having an opening to expose a surface of a first electrode of said plurality of electrodes, said opening having a second end part;said first end part is located outside of said second end part,
    said interlayer insulating film formed between said protective film and said pixel electrode;
    said pixel electrode formed with stepless angled surfaces within said opening, and in electrical contact with said first electrode.

2. The display device according to claim 1, wherein said interlayer insulating film is in contact with said first electrode that is in contact with said pixel electrode.

3. The display device according to claim 1, wherein said protective film situated in said opening is covered with said interlayer insulating film.

4. The display device according to claim 1,
    wherein said opening has a lower opening formed in said protective film and an upper opening formed in said interlayer insulating film;
    an upper most edges of said lower opening form a shape close to a polygon;
    an upper most edges of said upper opening form a shape close to a polygon; and
    an area of said shape close to a polygon of said lower opening is larger than an area of said shape close to a polygon of said upper opening.

5. The display device according to claim 1,
    wherein said pixel electrode is formed of at least a metallic material selected from the group consisting of aluminum, aluminum alloy and silver.

6. The display device according to claim 1,
    wherein said pixel electrode has a first pixel electrode layer formed of titanium and a second pixel electrode layer formed of at least one material selected from aluminum and aluminum alloy.

7. The display device according to claim 1,
    wherein said pixel electrode is formed of at least one material selected from aluminum and aluminum alloy, and a thickness of said one material ranges approximately from about 50 nm to about 300 nm.

8. A video display apparatus provided with the display device as cited in claim 1.

9. An information processing apparatus provided with the display device as cited in claim 1.

10. The display device according to claim 1,
    wherein said opening has a lower opening formed in said protective film and an upper opening formed in said interlayer insulating film;
    said lower opening has a first gradient;
    said upper opening has a second gradient;
    an area of said upper opening is larger than an area of said lower opening; and
    said second gradient is larger than said first gradient.

11. The display device according to claim 1,
    wherein the opening with a cross-section thereof configured in a V letter like slanting shape is formed in said protective film and said interlayer insulating film,
    said opening has a first end part formed on said protective film and a second end part formed on said interlayer film, and
    said first end part is located outside of said second end part.

12. The display device according to claim 1, further comprising a plurality of scanning line electrodes and a plurality of signal line electrodes disposed on said transparent substrate in a matrix pattern,
    wherein said plurality of scanning line electrodes are formed in a first direction;
    said plurality of signal line electrodes are formed in a direction orthogonal to said first direction; and
    said nonlinear element is located at each respective point of intersection of said plurality of scanning line electrodes and said plurality of signal line electrodes.

13. The display device according to claim 1 further comprising:
    a transparent electrode substrate;
    a liquid crystal cell;
    a plurality of scanning line electrodes; and
    a plurality of signal line electrodes,
    wherein said liquid crystal cell is located between said transparent electrode substrate and said pixel electrode;
    said plurality of scanning line electrodes and said plurality of signal line electrodes are arranged in a matrix pattern;
    a second electrode out of said plurality of electrodes disposed on said nonlinear element is connected with said scanning line electrode;
    a third electrode out of said plurality of electrodes disposed on said nonlinear element is connected with said signal line electrode; and said plurality of scanning line electrodes and said plurality of signal line electrodes are insulated electrically from one another.

14. A display device, which employs a liquid crystal material, comprising:

a transparent substrate;

a nonlinear element having a plurality of electrodes, said nonlinear element being disposed on said transparent substrate;

a protective film disposed on said nonlinear element;

an interlayer insulating film disposed on said protective film; and a pixel electrode disposed on said interlayer insulating film, said interlayer insulating film having an opening to expose a surface of a first electrode of said plurality of electrodes;

said interlayer insulating film formed between said protective film and said pixel electrode;

said pixel electrode formed with stepless angled surfaces within said opening; and in electrical contact with said first electrode;

said opening has a lower opening formed in said protective film and an upper opening formed in said interlayer insulating film;

upper most edges of said lower opening form a shape close to a square;

upper most edges of said upper opening form a shape close to a square; and a longitudinal length of said shape close to a square of said lower opening is larger than a longitudinal length of said shape close to a square of said upper opening.

15. The display device according to claim 14, wherein said longitudinal length of the lower opening ranges approximately from 5 $\mu$m to 30 $\mu$m and also said longitudinal length of the upper opening ranges approximately from 5 $\mu$m to 30 $\mu$m.

16. a video display apparatus provided with the display device of claim 14.

17. An information processing apparatus provided with the display device of claim 14.

18. A display device, which employs a liquid crystal material, comprising:

a transparent substrate;

a nonlinear element having a plurality of electrodes, said nonlinear element being disposed on said transparent substrate;

a protective film disposed on said nonlinear element;

an interlayer insulating film disposed on said protective film; and a pixel electrode disposed on said interlayer insulating film, said interlayer insulating film having an opening to expose a surface of a first electrode of said plurality of electrodes;

said interlayer insulating film formed between said protective film and said pixel electrode;

said pixel electrode formed with stepless angled surfaces within said opening; and in electrical contact with said first electrode;

said opening has a lower opening formed in said protective film and an upper opening formed in said interlayer insulating film;

upper most edges of said lower opening form a shape close to a square;

upper most edges of said upper opening form a shape close to a square; and a lateral length of said shape close to a square of said lower opening is larger than a lateral length of said shape close to a square of said upper opening.

19. The display device according to claim 18 wherein said lateral length of the lower opening ranges approximately from 5 $\mu$m to 30 $\mu$m and also said lateral length of the upper opening ranges approximately from 5 $\mu$m to 30 $\mu$m.

20. A video display apparatus provided with the display device of claim 18.

21. An information processing apparatus provided with the display device of claim 18.

* * * * *